US00RE43634E

(19) United States
(12) Reissued Patent
Mischel, Jr.

(10) Patent Number: US RE43,634 E
(45) Date of Reissued Patent: Sep. 11, 2012

(54) MIRROR

(75) Inventor: James V. Mischel, Jr., Seattle, WA (US)

(73) Assignee: Electric Mirror, LLC, Everett, WA (US)

(21) Appl. No.: 29/320,737

(22) Filed: Jul. 2, 2008

Related U.S. Patent Documents

Reissue of:
(64) Patent No.: Des. 559,553
Issued: Jan. 15, 2008
Appl. No.: 29/262,001
Filed: Jun. 23, 2006

(51) LOC (9) Cl. ..... 06-07
(52) U.S. Cl. ..... D6/308; D14/371
(58) Field of Classification Search ..... D6/300–314, D6/444; D20/10; 40/700, 735, 738, 768, 40/769, 701, 717; D28/64.1; 250/492.23; D14/129, 371; D11/132
See application file for complete search history.

(56) References Cited

U.S. PATENT DOCUMENTS

| | | | |
|---|---|---|---|
| 593,036 | A | 11/1897 | Stuparich |
| D114,451 | S | 4/1939 | Lazarus |
| 2,268,529 | A | 12/1941 | Stiles |
| 2,351,877 | A | 6/1944 | Rabkin |
| 2,659,992 | A | 11/1953 | Kiehl |
| 3,038,771 | A | 6/1962 | Schwartz |
| D221,670 | S | 8/1971 | Seidman |
| 3,786,584 | A | 1/1974 | Holson |
| D230,773 | S | 3/1974 | Arnold |
| D254,643 | S | 4/1980 | Ashenfarb |
| D265,485 | S | 7/1982 | Liptak |
| D268,349 | S | 3/1983 | Cobb |
| D270,066 | S | 8/1983 | Ackeret |
| D276,397 | S | 11/1984 | Pfanstiehl |
| 4,777,746 | A | 10/1988 | Brooks |
| D311,820 | S | 11/1990 | Glucksman |
| D320,364 | S | 10/1991 | Hernandez |
| 5,074,067 | A | 12/1991 | Cohart |
| D327,370 | S | 6/1992 | Mittelstrass |
| D335,148 | S | 4/1993 | Barbieri |
| 5,205,059 | A | 4/1993 | Doll |
| D336,205 | S | 6/1993 | Cooper |
| D339,921 | S | 10/1993 | Nourse |
| 5,279,880 | A | 1/1994 | Cohart |
| D345,379 | S | 3/1994 | Chan |
| 5,367,802 | A | 11/1994 | Rosenberg |
| D353,942 | S | 1/1995 | Lo |
| 5,392,544 | A | 2/1995 | Price |
| D364,507 | S | 11/1995 | Schwartz |
| 5,575,552 | A | 11/1996 | Faloon |
| D376,914 | S | 12/1996 | Waszkiewicz, III |
| D383,908 | S | 9/1997 | Waszkiewicz, III |

(Continued)

OTHER PUBLICATIONS

"Concord," ElectricMirror.com, <http://web.archive.org/web/20060311194445/www.electricmirror.com/concord.html>, as early as Mar. 2006.

(Continued)

*Primary Examiner* — Philip S Hyder
*Assistant Examiner* — Sydney R Buffalow
(74) *Attorney, Agent, or Firm* — Peloquin, PLLC; Mark S. Peloquin, Esq.

(57) CLAIM

The ornamental design for a [backlit] mirror [with tv], as shown [and described].

DESCRIPTION

FIG. 1 is a perspective view of a [backlit] mirror [with tv], showing [our] *my* new design[:];
FIG. 2 is a front view thereof;
FIG. 3 is a left side view and a right side view thereof;
FIG. 4 is a top view and bottom view thereof; and,
FIG. 5 is a back view thereof.

1 Claim, 3 Drawing Sheets

Figure 1:
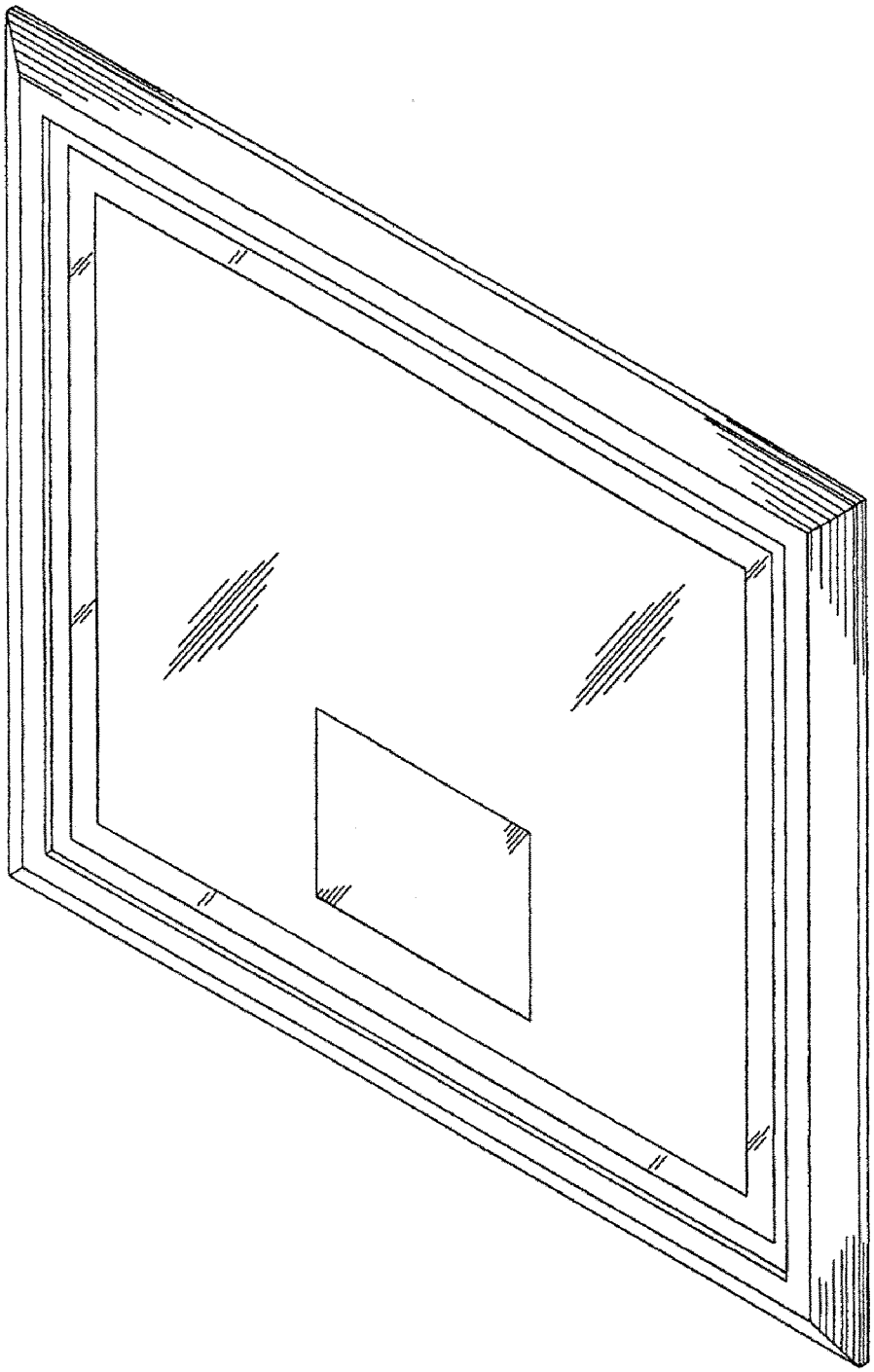
Figure 2:
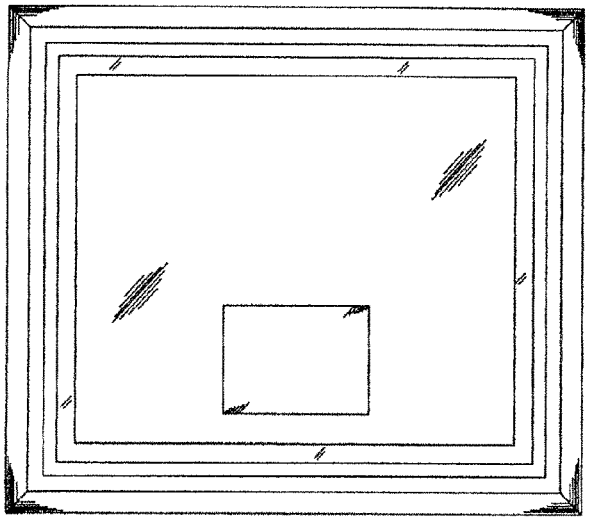
Figure 3:
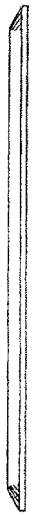
Figure 4:
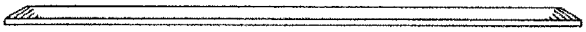
Figure 5:
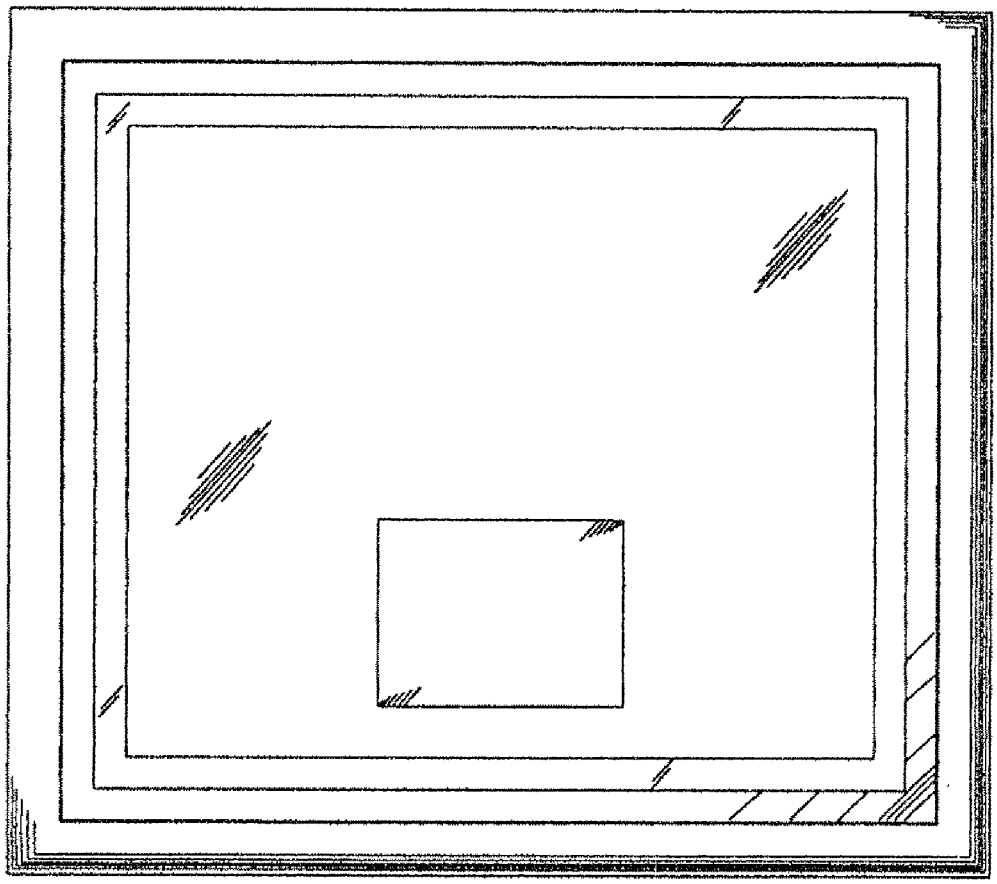

Matter enclosed in heavy brackets [ ] appears in the original patent but forms no part of this reissue; matter printed in italics indicates the additions made by reissue.

U.S. PATENT DOCUMENTS

| | | | |
|---|---|---|---|
| D384,304 | S | 9/1997 | Sheldon |
| D384,821 | S | 10/1997 | Sugar |
| D384,823 | S | 10/1997 | Sugar |
| D390,010 | S | 2/1998 | Fry |
| D405,473 | S | 2/1999 | Tikhonski |
| D415,355 | S | 10/1999 | Lewis |
| D424,812 | S | 5/2000 | Kacius |
| 6,099,928 | A | 8/2000 | Chee |
| 6,119,386 | A | 9/2000 | Henry |
| D431,909 | S | 10/2000 | Henry |
| D433,573 | S | 11/2000 | Rochon |
| D434,571 | S | 12/2000 | Copeland |
| D437,121 | S | 2/2001 | Henry |
| D458,459 | S | 6/2002 | Gottwald |
| D471,236 | S | 3/2003 | Robbins, III |
| D480,923 | S | 10/2003 | de Neubourg |
| D483,747 | S | 12/2003 | Berube |
| D502,005 | S | 2/2005 | Henry |
| D524,061 | S | 7/2006 | Bruce |
| D524,555 | S | 7/2006 | Mohundro |
| D527,914 | S | 9/2006 | Sakaguchi |
| D531,819 | S | 11/2006 | Everson |
| D536,881 | S | 2/2007 | Mischel, Jr. |
| D546,565 | S | 7/2007 | Mischel, Jr. |
| D547,073 | S | 7/2007 | Mischel, Jr. |
| D559,555 | S | 1/2008 | Mischel, Jr. |
| D559,557 | S | 1/2008 | Mischel, Jr. |
| 2002/0069567 | A1 | 6/2002 | Marino |
| 2005/0005494 | A1 | 1/2005 | Way |

OTHER PUBLICATIONS

"Esteem," ElectricMirror.com, <http://web.archive.org/web/20060709052833/www.electricmirror.com/esteem.html>, as early as Mar. 2006.

"Inspiration," ElectricMirror.com, <http://web.archive.org/web/20060311194135/www.electricmirror.com/inspiration.html>, as early as Mar. 2006.

"Masterpiece," ElectricMirror.com, <http://web.archive.org/web/20030831074237/www.electricmirror.com/english/menu.masterpiece.html>, as early as Aug. 2003.

Mischel Jr., J.V., et al., "Backlit Mirror With TV," U.S. Appl. No. 29/258,434, filed Apr. 22, 2006.

Mischel Jr., J.V., "Backlit Mirror," U.S. Appl. No. 29/266,157, filed Sep. 14, 2006.

"Momentum," ElectricMirror.com, <http://web.archive.org/web/20030831074416/www.electricmirror.com/english/menu/momentum.html>, as early as Aug. 2003.

"Steel Pleasure E201," ElectricMirror.com, <http://web.archive.org/web/20030831074823/www.electricmirror.com/english/menu/steelpleasure...html>, as early as Aug. 2003.